US009363989B1

(12) United States Patent
Wells

(10) Patent No.: US 9,363,989 B1
(45) Date of Patent: Jun. 14, 2016

(54) TORQUED SLIDE BAR ANIMAL TRAP

(71) Applicant: Harley Odeal Wells, Safford, AZ (US)

(72) Inventor: Harley Odeal Wells, Safford, AZ (US)

(*) Notice: Subject to any disclaimer, the term of this patent is extended or adjusted under 35 U.S.C. 154(b) by 159 days.

(21) Appl. No.: 14/505,358

(22) Filed: Oct. 2, 2014

(51) Int. Cl.
*A01M 23/16* (2006.01)
*A01M 23/18* (2006.01)
*A01M 23/02* (2006.01)

(52) U.S. Cl.
CPC .............. *A01M 23/18* (2013.01); *A01M 23/02* (2013.01)

(58) Field of Classification Search
CPC ...... A01M 23/18; A01M 23/20; A01M 23/16
USPC ............................................................. 43/61
See application file for complete search history.

(56) References Cited

U.S. PATENT DOCUMENTS

| | | | | |
|---|---|---|---|---|
| 363,536 | A * | 5/1887 | Ebenezer | A01M 23/18 43/61 |
| 1,461,681 | A * | 7/1923 | Schuckman | A01M 23/20 43/61 |
| 2,412,518 | A | 12/1946 | Krelwitz | |
| 2,524,504 | A * | 10/1950 | Grizwold | A01M 23/20 43/61 |
| 3,426,470 | A * | 2/1969 | Faucette | A01M 23/18 43/61 |
| 4,179,835 | A | 12/1979 | Hunter | |
| 4,546,568 | A * | 10/1985 | Seyler | A01M 23/20 43/61 |
| 4,590,704 | A * | 5/1986 | Volk | A01M 23/18 43/60 |
| 4,682,441 | A | 7/1987 | Straver | |
| 4,899,484 | A | 2/1990 | Morin | |
| 5,329,723 | A * | 7/1994 | Liul | A01M 23/18 43/61 |
| 5,345,710 | A * | 9/1994 | Bitz | A01M 23/20 43/61 |
| 5,615,514 | A | 4/1997 | Meade, Jr. | |
| 5,862,624 | A | 1/1999 | Askins | |
| 5,864,982 | A | 2/1999 | Tully et al. | |
| 6,484,436 | B1 | 11/2002 | Chang | |
| 6,609,327 | B2 | 8/2003 | Stoico et al. | |
| 6,658,788 | B1 | 12/2003 | Steinfest | |
| 6,990,767 | B1 * | 1/2006 | Margalit | A01M 23/20 43/61 |
| 8,627,595 | B2 | 1/2014 | Radesky et al. | |
| 2003/0019148 | A1 * | 1/2003 | Kao | A01M 23/18 43/61 |

* cited by examiner

*Primary Examiner* — Shin Kim
(74) *Attorney, Agent, or Firm* — Williams Intellectual Property; Benjamin F. Williams

(57) ABSTRACT

A torqued slide bar animal trap having a cage door hingedly disposed at a top side of a cage apparatus, said cage door supportable in an open position angularly extended longitudinally from the cage apparatus when a slide bar is engaged to an attachment piece, said attachment piece disposed upon the cage door proximal the top side of the cage apparatus, wherein the cage door applies torque to the slide bar and rapidly swings to a closed position enclosing an open end of the cage apparatus when a trigger mechanism releases the slide bar from the attachment piece, and each of a pair of ring members falls along each of a pair of door frame struts and an associated one of a pair of door bars to secure the cage door in the closed position by prevention of divergence of the cage door from the open end.

6 Claims, 4 Drawing Sheets

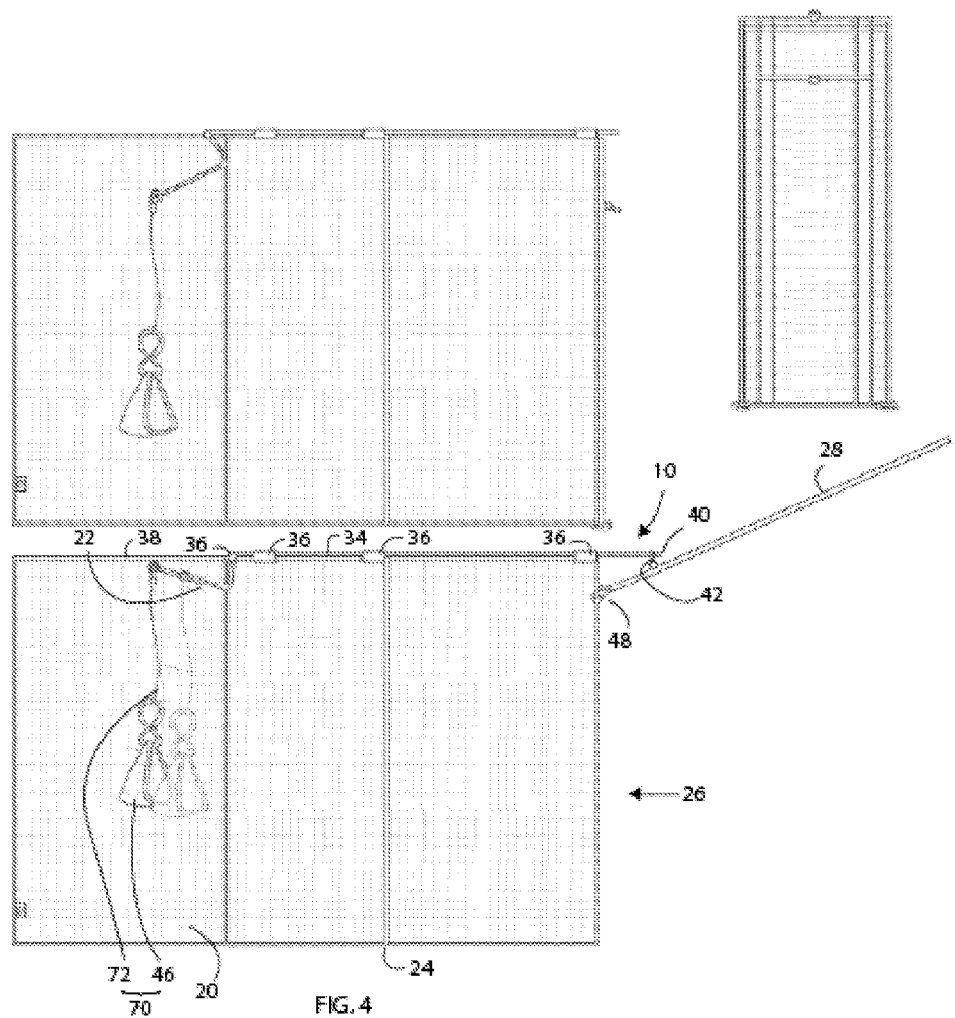
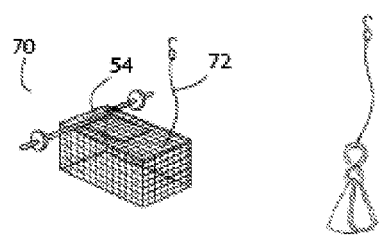
FIG. 6
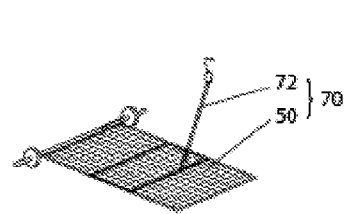
FIG. 5
FIG. 4

TORQUED SLIDE BAR ANIMAL TRAP

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of animal traps are known in the prior art. However, what is needed is a torqued slide bar animal trap that includes a cage door hingedly disposed at a top side of a cage apparatus, said cage door supportable in an open position angularly extended longitudinally from the cage apparatus when a slide bar is engaged to an attachment piece, the attachment piece disposed upon the cage door proximal the top side of the cage apparatus, wherein the cage door applies torque to the slide bar and rapidly swings to a closed position when a trigger mechanism releases the slide bar from the attachment piece, whereby each of a pair of ring members falls along each of a pair of door frame struts and an associated one of a pair of door bars to secure the cage door in the closed position by prevention of divergence of the cage door from the open end.

FIELD OF THE INVENTION

The present invention relates to a torqued slide bar animal trap, and more particularly, to a torqued slide bar animal trap having a cage door hingedly disposed at a top side of a cage apparatus, said cage door supportable in an open position angularly extended longitudinally from the cage apparatus when a slide bar is engaged to an attachment piece, said attachment piece disposed upon the cage door proximal the top side of the cage apparatus, wherein the cage door applies torque to the slide bar and rapidly swings to a closed position enclosing an open end of the cage apparatus when a trigger mechanism releases the slide bar from the attachment piece, and each of a pair of ring members falls along each of a pair of door frame struts and an associated one of a pair of door bars to secure the cage door in the closed position by prevention of divergence of the cage door from the open end.

SUMMARY OF THE INVENTION

The general purpose of the torqued slide bar animal trap, described subsequently in greater detail, is to provide a torqued slide bar animal trap which has many novel features that result in a torqued slide bar animal trap which is not anticipated, rendered obvious, suggested, or even implied by prior art, either alone or in combination thereof.

The present torqued slide bar animal trap has been devised to enable automated enclosure of a cage apparatus when an animal triggers a slide bar to move from a first position to a second position. The slide bar is positioned with a second end engaged within an attachment piece disposed upon a cage door, wherein the cage door applies torque to the slide bar to effect ready and rapid movement of the slide bar to the second position, whereby the cage door is swung under the influence of gravity to a closed position and secured thereat by means of a pair of ring members slidably disposed to prevent opening of the cage door, as will be subsequently described.

The present torqued slide bar animal trap, therefore, includes a cage apparatus sized appropriate for enclosure of large animals and predators, although additional sized cage apparatuses are contemplated as operational via the same mechanism as herein disclosed.

The cage apparatus includes a top side, a bottom side, and an open end. A cage door is hingedly disposed to enclose the open end by pivotal attachment at the top side of the cage apparatus. The cage door is thereby moveable between an open position and a closed position by swinging movement along a projective plane of arc. The cage door is disposed longitudinally extended from the cage apparatus when moved in the open position. The cage door is moved to a vertical situation to enclose the open end of the cage apparatus when moved to the closed position.

An attachment piece is disposed exteriorly upon the cage door proximal the top side of the cage apparatus. The attachment piece is positioned to engage with the second end of the slide bar when the cage door is moved to the open position and the cage door is moved to the open position. The proximity of the attachment piece to the top side of the cage apparatus renders a greater portion of the cage door extended therefrom than is disposed between the attachment piece and the side bar when the door is engaged in the open position. An amount of torque equivalent to the weight of the cage door multiplied by the length of the door from the attachment piece to the door's outmost extremity is thereby applied to the second end of the slide bar. The slide bar is thus torqued when the cage door is engaged in the open position, and the caged apparatus is set for trapping an animal therein.

An L bracket is pivotally disposed endwise upon a first end of the slide bar. The L bracket is pivotally moveable between a set position and a dropped position, said L bracket thereby effecting longitudinal movement of the slide bar between a first position and the second position. Thus pivotal action of the L bracket is translated to longitudinal movement of the slide bar, and movement of the L bracket to the dropped position forces movement of the slide bar to the second position. Torque applied to the slide bar by the cage door when engaged in the open position thereby renders forced movement of the slide bar to the second position, said movement thereby rapid and to effectuated by small movement of the L bracket.

Pivotal action of the L bracket is effective by a bait support attached depending from the L bracket. Bait is additional to the bait support to attract animals and predators into the cage apparatus. Force applied to the bait readily effects movement of the bait support and thereby effects pivotal movement of the L bracket whereby the slide bar effects release of the cage door, which cage door then readily swings to the closed position enclosing the open end of the cage apparatus and trapping the animal inside. To secure the cage door in the closed position a pair of ring members is included, each of said pair of ring members slidably mounted around each of a pair of door frame struts and a corresponding one of a pair of door bars. Each of the pair of door frame struts vertically borders the open end and each of the pair of door bars is disposed upon the cage door to position parallel with the pair of door frame struts when the cage door is moved to the closed position.

Vertical displacement of the pair of ring members from a top position to a bottom position is therefore effective when the cage door is moved to the closed position, each of said pair of ring members falling to the bottom position under the influence of gravity down each of the pair of door frame struts and each corresponding one of the pair of door bars. When in the bottom position, each of the pair of ring members prevent opening of the cage door by maintaining parallel situation of each of the pair of door frame struts and each of the pair of door bars.

In order to move the cage door to the open position, each of the pair of ring members must be moved to the top position. Since the cage door is hinged at the top side of the cage apparatus, when each of the pair of ring members is moved to the top position, and thereby situated proximal the top side of the cage apparatus, divergence of the pair of door bars from the pair of door frame struts is possible, and the cage door is thereby positional in the open position. Movement of the slide bar to the first position, whereby the slide bar second end engages the attachment piece, thereby maintains the door in the open position.

Since the open position situates the cage door at an angled extension above the plane of the top side of the cage apparatus, each of the pair of rings is then disposed at the top position and maintained thereat by said divergent pair of door bars. The door then applies torque to the second end of the slide bar, and the torqued slide bar animal trap is set. Movement of the slide bar to the second position, such as when the bait support is pulled, engaged, or otherwise forced by an animal inside the trap, therefore releases the cage door to swing under the influence of gravity to the closed position wherein each of the pair of door bars is situated vertically and downward displacement of each of the pair of ring members is enabled to the bottom position whereby the cage door is secured in the closed position.

Additional embodiments of the present invention are contemplated whereby the bait support is substituted for alternative structure usable to trigger release of the slide bar second end from the attachment piece. For example, a pedal member is contemplated pivotally disposed interior to the cage apparatus upon the bottom side. The pedal member is connected to the L bracket whereby pivotal movement of the pedal, such as when an animal ambulates thereupon, is translated to move the L bracket from the set position to the dropped position. A second cage, for use with live bait, is contemplated likewise pivotally attached interior to the cage apparatus whereby force applied to the second cage translates movement to the L bracket from the set position to the dropped position.

Thus has been broadly outlined the more important features of the present torqued slide bar animal trap so that the detailed description thereof that follows may be better understood and in order that the present contribution to the art may be better appreciated.

Objects of the present torqued slide bar animal trap, along with various novel features that characterize the invention are particularly pointed out in the claims forming a part of this disclosure. For better understanding of the torqued slide bar animal trap, its operating advantages and specific objects attained by its uses, refer to the accompanying drawings and description.

BRIEF DESCRIPTION OF THE DRAWINGS

Figures

FIG. 4 is a side view with a cage door disposed in an open position.
FIG. 5 is an isometric view of a pedal member, an embodiment of a trigger mechanism.
FIG. 6 is an isometric view of a second cage member, an embodiment of the trigger mechanism.

DETAILED DESCRIPTION OF THE DRAWINGS

Figure 1:
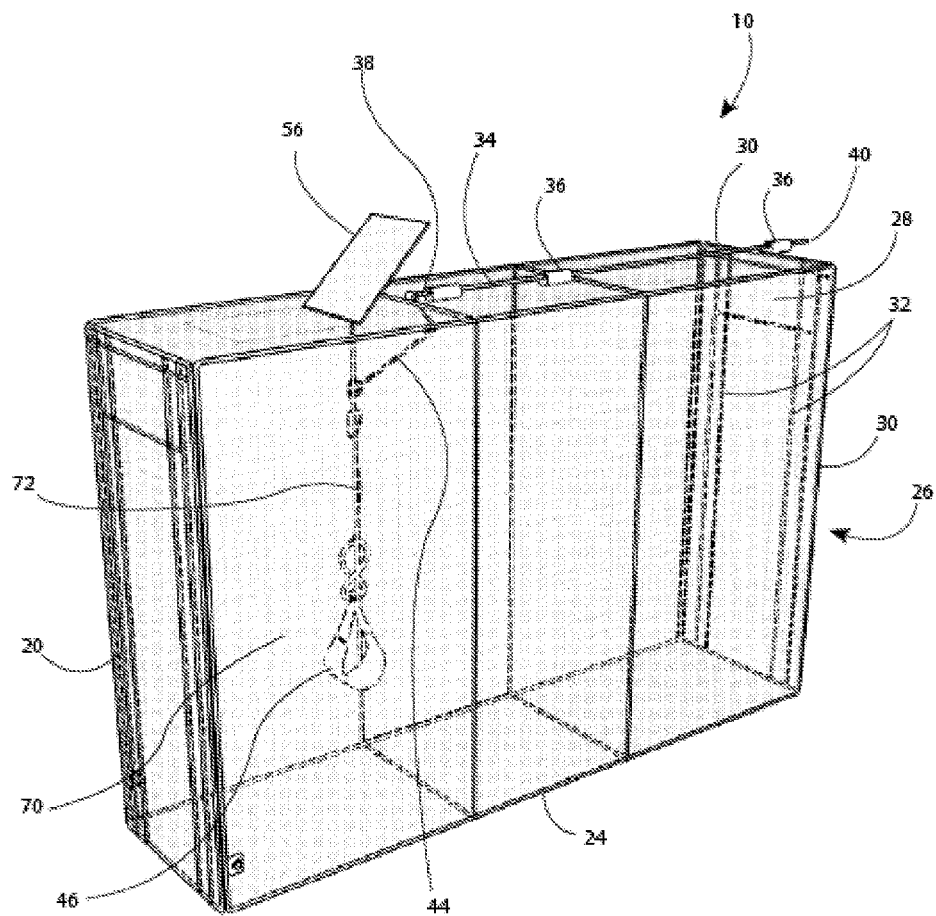
FIG. 1 is an isometric view.
Figure 2:
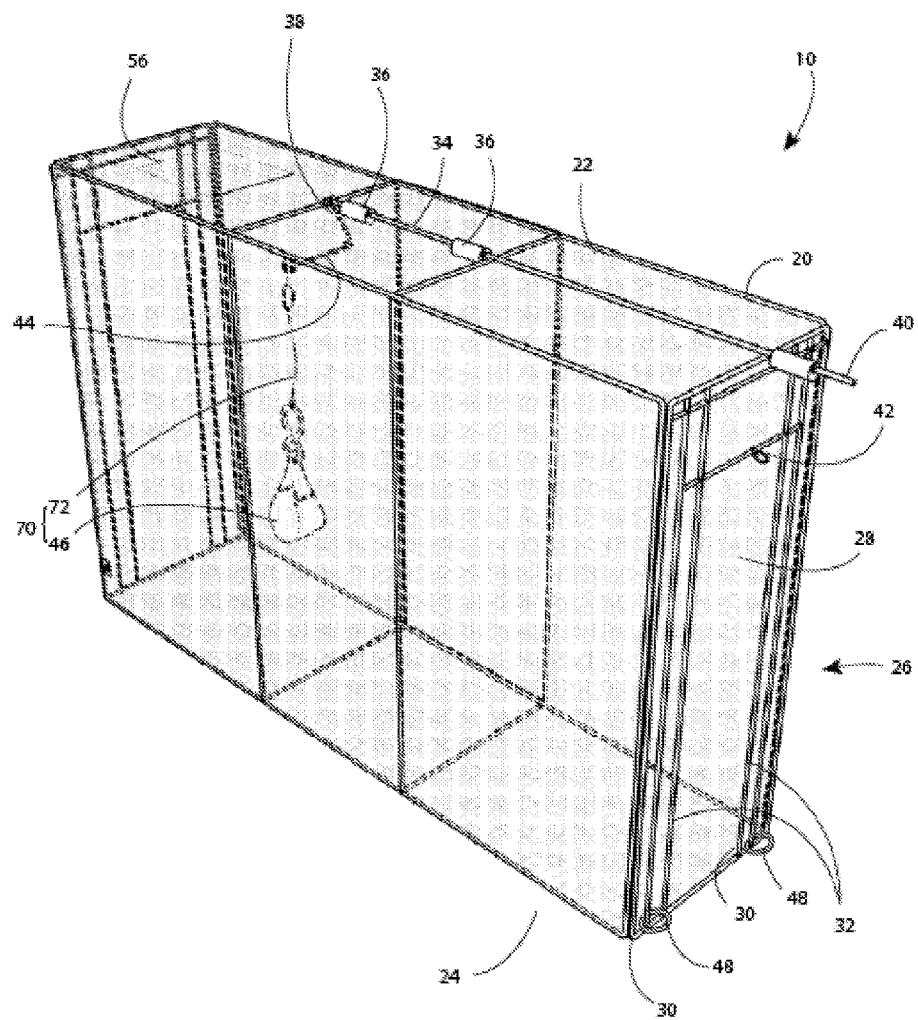
FIG. 2 is an isometric view.
Figure 3:
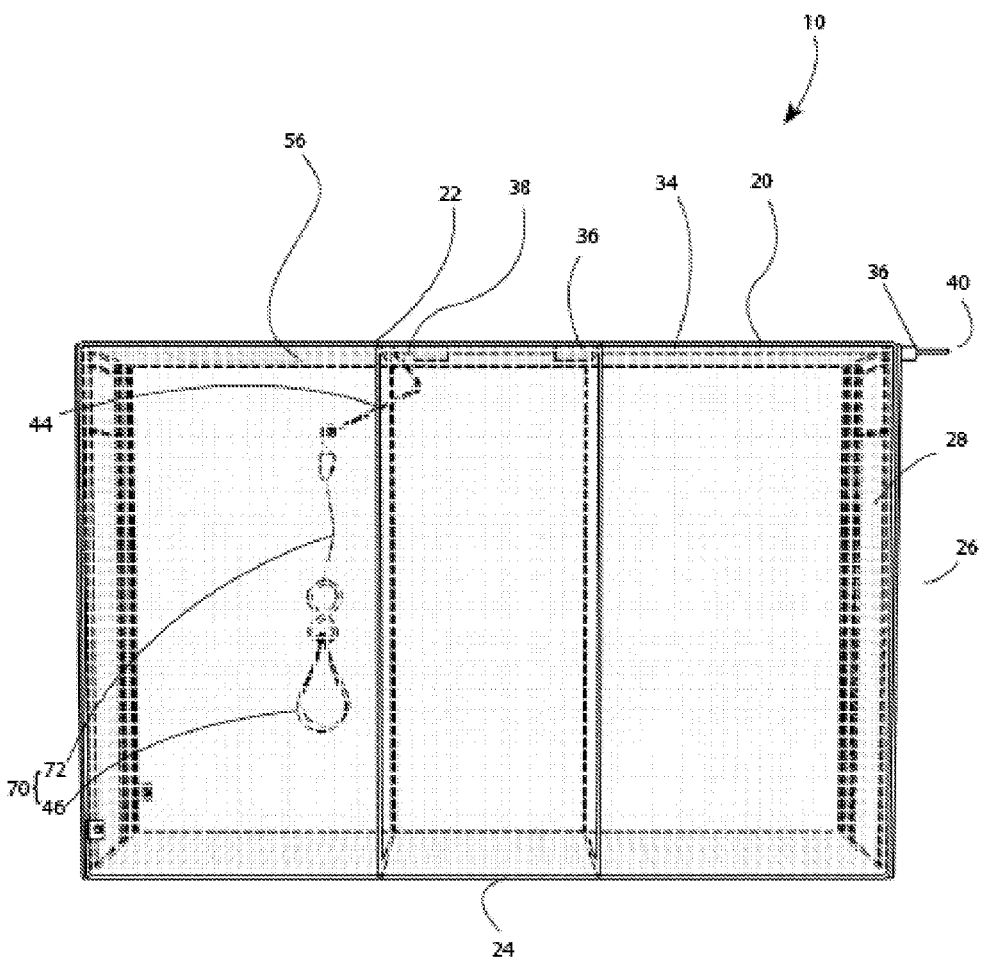
FIG. 3 is a side view with a cage door disposed in a closed position.

With reference now to the drawings, and in particular FIGS. 1 through 4 thereof, example of the instant torqued slide bar animal trap employing the principles and concepts of the present torqued slide bar animal trap and generally designated by the reference number 10 will be described.

Referring to FIGS. 1 through 4 a preferred embodiment of the present torqued slide bar animal trap 10 is illustrated.

The present torqued slide bar animal trap 10 has been devised to entrap animals within a cage apparatus 20 when a cage door 28 swings down to a closed position. The present torqued slide bar animal trap 10 has been devised with a minimum of moving parts durably arranged whereby repeated use of the torqued slide bar animal trap 10 is enabled without appreciable wear to the apparatus. Moreover, the present torqued slide bar animal trap 10 is suited for use trapping larger mammals and predators.

The present torqued slide bar animal trap 10, therefore, includes a cage apparatus 20 having a top side 22, a bottom side 24, and an open end 26. A cage door 28 is disposed hinged at the top side 22, thereat moveable between an open position and a closed position. The cage door 28 encloses the open end 26 when moved to the closed position.

A pair of door frame struts 30 is vertically disposed bounding the open end 26 of the cage apparatus 20 on either side of the cage door 28. The cage door 28 includes a pair of door bars 32, disposed longitudinally along either side of the cage door 28. Each of said pair of door bars 32 is disposed in parallel with the pair of door frame struts 30 when the cage door 28 is moved to the closed position. When moved to the open position, the cage door 28 is swung upward and pivoted about the top side 22 of the open end 26 of the cage apparatus 20. The cage door 28 is thereby disposed at an angle extended longitudinally out from the cage apparatus 20 when moved to the open position.

A slide bar 34 is disposed upon the top side 22 of the cage apparatus 20, said slide bar 34 disposed through a plurality of sleeve members 36. The slide bar 34 includes a first end 38 and a second end 40. The slide bar 34 is travelable within each of the plurality of sleeve members 36, and is therefore longitudinally moveable between a first position and a second position along the top side 22 of the cage apparatus 20.

An attachment piece 42 is disposed upon the cage door 28 proximal the top side 22 of the cage apparatus 20. The attachment piece 42 is positional to engage the second end 40 of the slide bar 34 when the cage door 28 is moved to the open position and the slide bar 34 is situated in the first position. Thus, a user moves the cage door 28 to the open position and sets the cage door 28 in the open position by engagement of the slide bar 34 second end 40 into the attachment piece 42. The slide bar 34, engaged by the attachment piece 42, prevents downward displacement of the cage door 28 under gravity and therefore maintains the cage door 28 in the open position.

Because the attachment piece 42 is disposed proximal the top side 22 of the cage apparatus 20, and therefore proximal the pivot point of the cage door 28, the weight of the cage door 28 in the open position applies torque to the slide bar 34, whereby movement of the slide bar 34 to the second position disengages the attachment piece 42 and the cage door 28 falls to the closed position under the influence of gravity. A small movement of the slide bar 34 in the direction of the second position, therefore, releases the slide bar 34 second end 40, and the cage door 28 falls to the closed position.

An L bracket 44 is pivotally disposed at the first end 38 of the slide bar 34. The L bracket 44 is moveable between a set position and a dropped position. When the L bracket 44 is moved to the set position, the slide bar 34 is moved to the first position. When the L bracket 44 is moved to the dropped position, the slide bar 34 is moved to the second position. Thus force or action applied to the L bracket 44, whereby the L bracket 44 is moved between the set position and the dropped position, is readily translated to the slide bar 34.

Due to the torque applied to the slide bar 34 when engaged in the attachment piece 42 and supportive of the cage door 28 in the open position, the L bracket 44 enables rapid release of the slide bar 34 when action is applied thereto. Thus the L bracket 44 triggers rapid closure of the cage door 28 by movement from the set position to the dropped position.

A trigger mechanism 70 is disposed attached endwise to the L bracket 44 by an attachment member 72. The trigger mechanism 70 is situated to trigger movement of the L bracket 44 from the set position to the dropped position when force is applied thereto. In the preferred embodiment herein disclosed, the trigger mechanism 70 is a bait support 46, as set forth below. However, alternative trigger mechanisms are contemplated as part of this disclosure, as set forth further below.

The bait support 46 is disposed depending from the L bracket 44 by the attachment member 72. The L bracket 44 is thus positional in the set position, whereby the slide bar 34 engages the cage door 28 in the open position, and bait is additional to the bait support 46. Action at the bait, such as when a predator takes the bait or otherwise displaces it, therefore, applies force to the bait support 46 whereby the L bracket 44 is triggered from the set position to the dropped position, the slide bar 34 is concurrently released and forced from the attachment piece 42 by the torque of the cage door 28 as well as by force applied to the bait, and the cage door 28 falls to the closed position.

To automatically secure the cage door 28 in the closed position, each of a pair of ring members 48 is disposed around one of the pair of door frame struts 30 and an adjacent one of the pair of door bars 32. Each of the pair of ring members 48 is moveable between a top position, disposed at the cage apparatus 20 top side 22, and a bottom position, disposed proximal the cage apparatus 20 bottom side 24. When the cage door 28 is disposed in the open position, each of the pair of ring members 46 is maintained at the top position; each of the pair of door bars 32 is divergent from each of the pair of door frame struts 30, whereby each of the pair of ring members 48 is prevented from travel downward under the influence of gravity, each of said pair of ring members 48 resting upon a corresponding one of the pair of door bars 32 at the top position. However, when the cage door 28 falls to the closed position, each of the pair of door bars 32 is moved to a position parallel to the pair of door frame struts 30 and travel of each of the pair of ring members 48 is enabled, whereby each of the pair of ring members 48 falls to the bottom position thereby securing the cage door 28 in the closed position by prevention of divergence of each of the pair of door bars 32 from each of the pair of door frame struts 30.

Since the trigger mechanism 70 is situated in the cage apparatus removed from the open end 26, a trap door 56 is disposed in the top side 22 of the cage apparatus 20 overlying the trigger mechanism 70 whereby access to bait the trigger mechanism 70 is enabled without a user having to enter the cage apparatus 20 through the cage door 28. The torqued slide bar animal trap 10 may therefore be set for use expediently by a user through the trap door 56 upon the top side 22.

An alternate embodiment is contemplated as part of this invention, wherein the trigger mechanism 70 includes a pedal member 50. The pedal member 50, disposed upon the cage apparatus 20 bottom side 24 interior to the cage apparatus 20 and connected to the L bracket 44 by the attachment member 72, pivots under the weight of an animal walking thereupon, and thus effects movement of the L bracket 44 to the dropped position whereby the slide bar 34 is moved to the second position and the cage door 28 is swung to the closed position.

A live bait trigger 52 is also contemplated as the trigger mechanism 70 in an alternative embodiment of the invention 10, wherein a second cage member 54, in which live bait is enclosable, is pivotally disposed upon the cage apparatus 20 bottom side 24, interior to said cage apparatus 20. The second cage member 54 is connected to the L bracket 44 by the attachment member 72 and movement of the second cage member 54, as engendered by a predator seeking the live bait, triggers movement of the L bracket 44 from the set position to the dropped position, thus sliding the slide bar 34 to the second position and effecting closure of the cage door 22 and entrapment of the predator.

What is claimed is:

1. A torqued slide bar animal trap comprising:
   a cage apparatus having a top side, a bottom side, and an open end;
   a cage door disposed hinged at the top side moveable between an open position and a closed position, said cage door enclosing the open end when disposed in the closed position;
   a pair of door frame struts vertically disposed on the open end, each of said pair of door frame struts disposed on either side of the cage door when the cage door is moved to the closed position;
   a pair of door bars disposed upon the cage door, each of said pair of door bars disposed in parallel with the pair of door frame struts when the cage door is moved to the closed position, each of said pair of door bars angled divergent from each of said pair of door frame struts when the cage door is moved to the open position;
   a slide bar disposed upon the top side of the cage apparatus, said slide bar having a first end and a second end moveable between a first position and a second position;
   an L bracket pivotally disposed at the first end of the slide bar, said L bracket moveable between a set position and a dropped position;
   an attachment piece disposed upon the cage door proximal the top side, said attachment piece positional to engage the second end of the slide bar when the cage door is moved to the open position and the slide bar is positioned in the first position, whereby the L bracket is moved to the set position and the door is maintainable in the open position;
   a pair of ring members, each of the pair of ring members disposed around one of the pair of door frame struts and an adjacent one of the pair of door bars, said pair of ring members moveable between a top position, disposed at the cage top side, and a bottom position, disposed proximal the cage bottom side; and
   a trigger mechanism connected to the L bracket by an attachment member, said trigger mechanism translating movement of said trigger mechanism to the L bracket to effect movement of the L bracket from the set position to the dropped position;

wherein each of the pair of ring members is maintained in the top position when the cage door is disposed in the open position and movement of the L bracket from the set position to the dropped position releases the slide bar second end from the attachment piece, whereby the cage door falls to the closed position and each of the pair of ring members falls from the top position to the bottom position thereby securing the cage door in the closed position.

2. The torqued slide bar animal trap of claim 1 further comprising a trap door disposed in the top side of the cage apparatus, said trap door disposed overlying the trigger mechanism for access thereto, whereby a user is enabled to bait the trigger mechanism directly through the trap door and set the L bracket to the set position.

3. The torqued slide bar animal trap of claim 2 wherein the trigger mechanism comprises a bait support disposed depending from the L bracket by the attachment member, said bait support supportive of bait applied thereto whereby movement or displacement of the bait from at the bait support is translated to the L bracket to effect movement of said L bracket from the set position to the dropped position.

4. The torqued slide bar animal trap of claim 2 wherein the trigger mechanism comprises a pedal member pivotally disposed interior to the cage apparatus upon the cage apparatus bottom side, said pedal member connected to the L bracket by the attachment member whereby pivotal movement of the pedal member is translated to the L bracket to effect movement of the L bracket from the set position to the dropped position.

5. The torqued slide bar animal trap of claim 2 wherein the trigger mechanism comprises a second cage member disposed to enclose live bait therein, said second cage member pivotally disposed interior to the cage apparatus upon the cage apparatus bottom side, said second cage member connected to the slide bar by the attachment member, wherein force applied to the second cage member is translated to the L bracket.

6. A torqued slide bar animal trap comprising:
a cage apparatus having a top side, a bottom side, and an open end;
a cage door disposed hinged at the top side, said cage door moveable between an open position and a closed position, said cage door enclosing the open end when disposed in the closed position;
a pair of door frame struts vertically disposed on the open end, each of said pair of door frame struts disposed on either side of the cage door when the cage door is moved to the closed position;
a pair of door bars disposed upon the cage door, each of said pair of door bars disposed in parallel with the pair of door frame struts when the cage door is moved to the closed position, each of said pair of door bars angled divergent from each of said pair of door frame struts when the cage door is moved to the open position;
a slide bar disposed upon the top side of the cage apparatus, said slide bar having a first end and a second end moveable between a first position and a second position;
an L bracket pivotally disposed at the first end of the slide bar, said L bracket moveable between a set position and a dropped position;
an attachment piece disposed upon the cage door proximal the top side, said attachment piece positional to engage the second end of the slide bar when the cage door is moved to the open position and the slide bar is positioned in the first position, whereby the L bracket is moved to the set position and the door is maintainable in the open position;
a pair of ring members, each of the pair of ring members disposed around one of the pair of door frame struts and an adjacent one of the pair of door bars, said pair of ring members moveable between a top position, disposed at the cage top side, and a bottom position, disposed proximal the cage bottom side;
a bait support disposed depending from the L bracket, said bait support moving the L bracket from the set position to the dropped position when bait situated upon the bait support is engaged by a predator; and
a trap door disposed in the top side of the cage apparatus, said trap door disposed overlying the trigger mechanism for access thereto, whereby a user is enabled to bait the trigger mechanism directly through the trap door and set the L bracket to the set position;
wherein each of the pair of ring members is maintained in the top position when the cage door is disposed in the open position and movement of the L bracket from the set position to the dropped position releases the slide bar second end from the attachment piece, whereby the cage door falls to the closed position and each of the pair of ring members falls from the top position to the bottom position thereby securing the cage door in the closed position.

\* \* \* \* \*